Nov. 5, 1957 H. M. TOWNSEND 2,812,207
PIVOTED VEHICLE VENTILATION WINDOW WITH ACTUATING MECHANISM
Filed Sept. 30, 1954 3 Sheets-Sheet 1
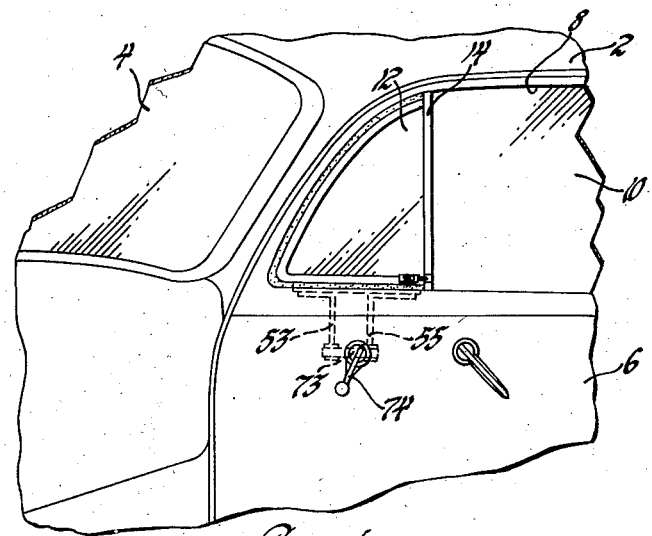
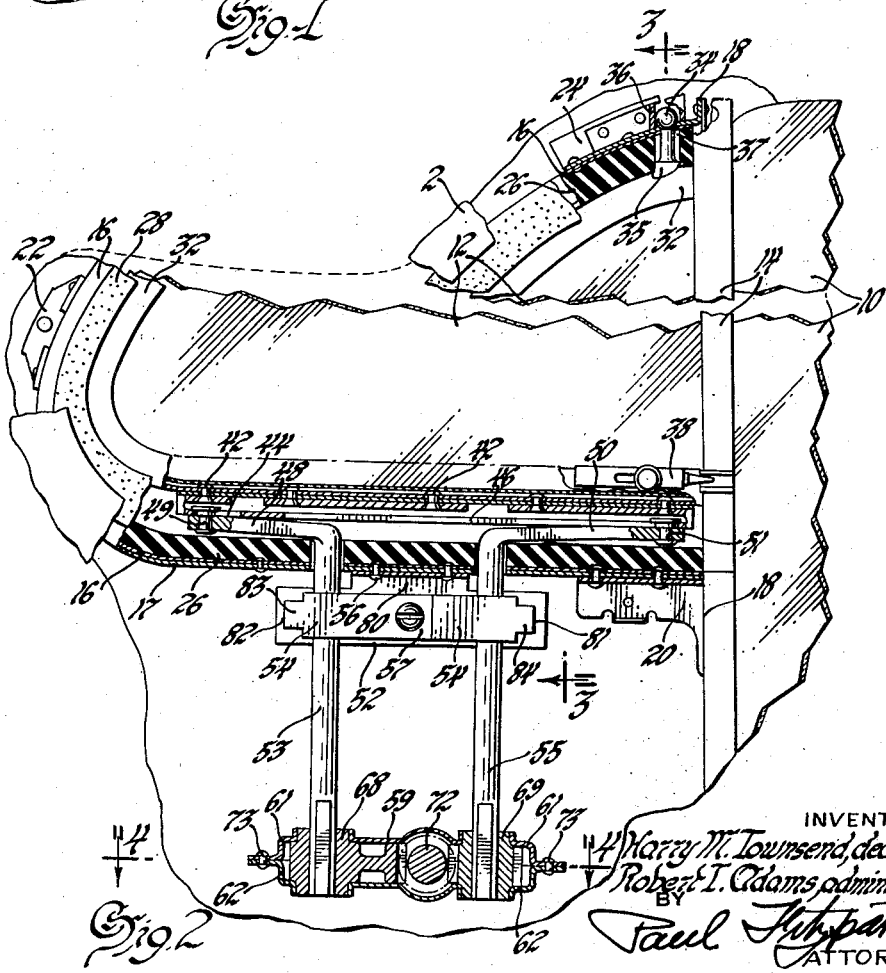
INVENTORS
Harry M. Townsend, deceased.
Robert I. Adams, administrator
BY Paul Fitzpatrick
ATTORNEY Nov. 5, 1957  H. M. TOWNSEND  2,812,207
PIVOTED VEHICLE VENTILATION WINDOW WITH ACTUATING MECHANISM
Filed Sept. 30, 1954  3 Sheets-Sheet 2
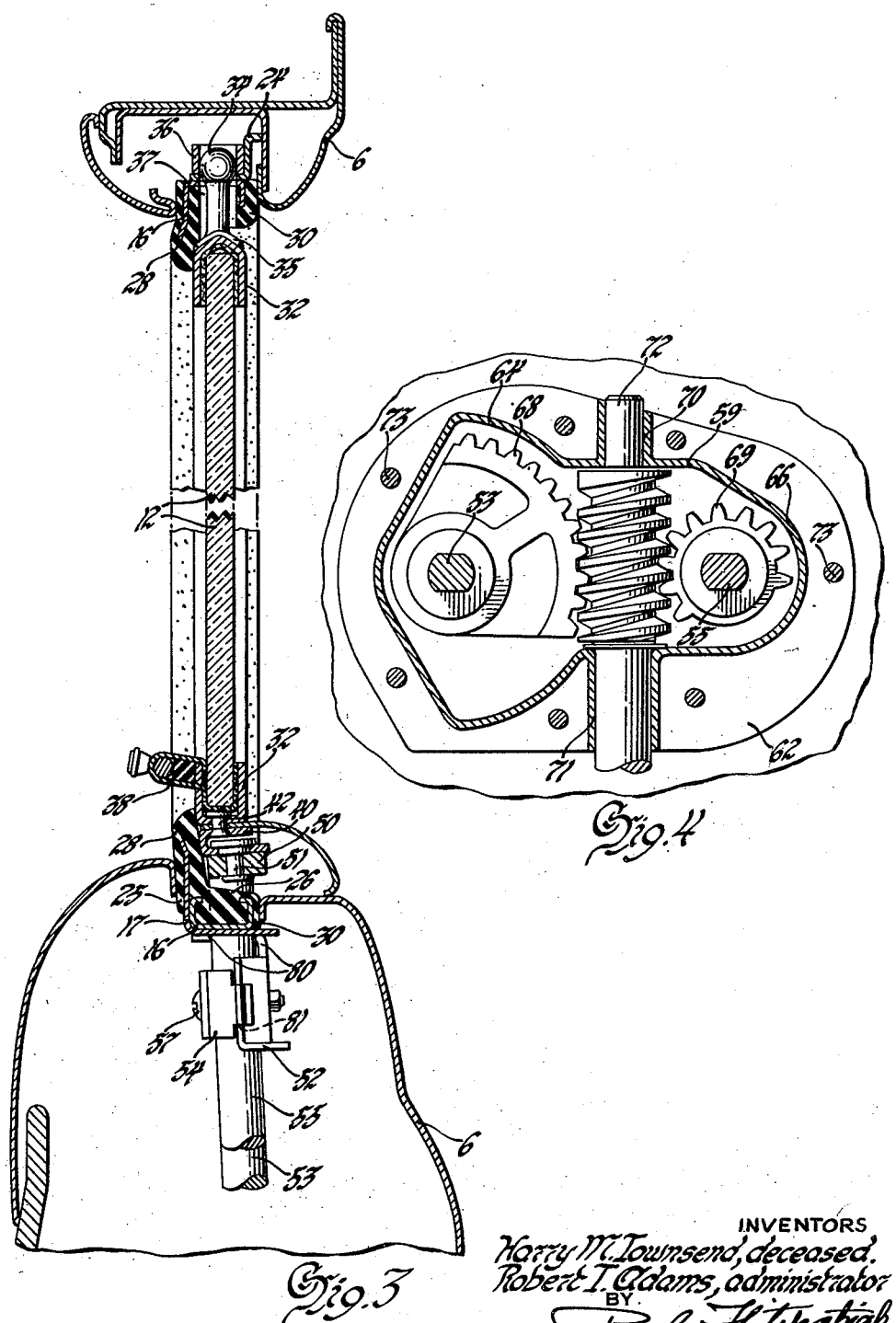
INVENTORS
Harry M. Townsend, deceased.
Robert T. Adams, administrator
BY
Paul Fitzpatrick
ATTORNEY

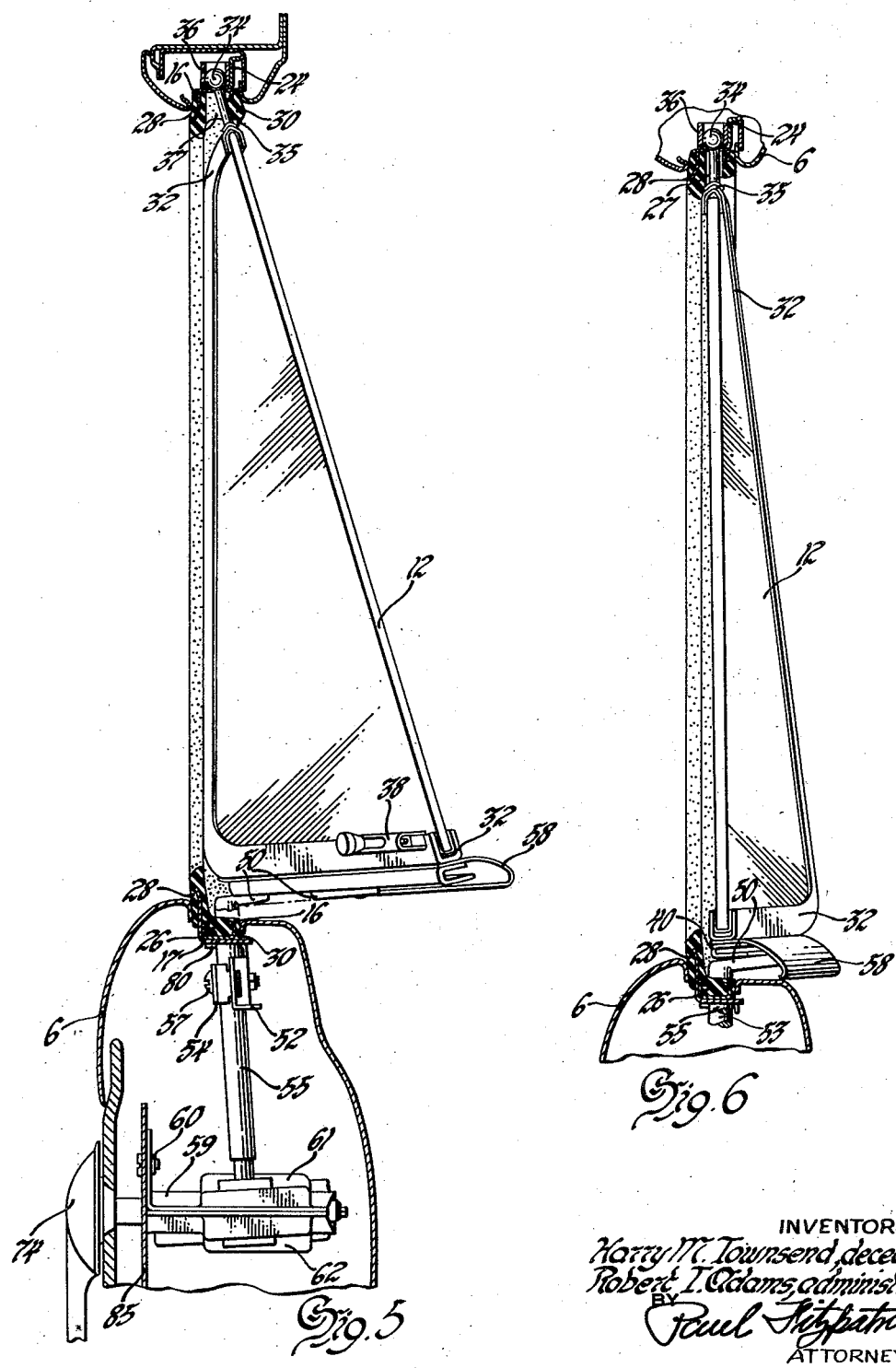

United States Patent Office 2,812,207
Patented Nov. 5, 1957

2,812,207

PIVOTED VEHICLE VENTILATION WINDOW WITH ACTUATING MECHANISM

Harry M. Townsend, deceased, late of Detroit, Mich., by Robert T. Adams, administrator, Detroit, Mich., assignor to General Motors Corporation, Detroit, Mich., a corporation of Delaware Application September 30, 1954, Serial No. 459,327

5 Claims. (Cl. 296—44)

This invention relates to windows and more particularly to ventilating windows for vehicle bodies.

Considerable progress has been made in the ventilation control of vehicle bodies by providing a window assembly of the type having a glass panel swingable to open and closed positions about a fixed pivotal axis.

As the glass panel swings about the fixed pivotal axis, it will cross over the weather strip usually provided around the window opening. This has led to relatively complicated weather strip designs at the points of cross-over to seal the body when the glass panel is in the closed position. The weather strip may also become torn or distorted at the points of cross-over and materially reduce the effectiveness of the seal.

When the glass panel swings to open position about the fixed pivotal axis, one portion of the panel moves inside the vehicle body, which allows rain to drip off this portion of the panel into the vehicle body.

This invention eliminates the problems of weather stripping and rain drippage by providing a new and improved ventilating window mounted at one point within a window opening by a universal joint connection and movable about this connection to various positions to one side of the window opening.

An object of this invention is to improve the ventilation control of vehicle bodies by providing a glass panel mounted within a window opening in the vehicle body and movable to various positions on one side of the opening. Another object of this invention is to provide a glass panel mounted within a window opening in a vehicle body wherein the panel is movable to one side of the opening without crossing over a weather strip provided around the opening. A further object of this invention is to provide a glass panel mounted within a window opening in a vehicle body wherein the entire panel is movable to various positions outside the vehicle body. Yet another object of this invention is to provide a glass panel mounted within a window opening in a vehicle body at one point by a universal joint connection and at another point by a bodily movable connection to allow rotational movement of the panel about the universal joint connection to various positions outside the vehicle body.

These and other objects of this invention will be readily apparent from the following specification and drawings in which:

Figure 1 is a view of a vehicle body with the glass panel in closed position within a window opening;

Figure 2 is an enlarged view of the operating mechanism of the glass panel;

Figure 3 is a view on the plane indicated by line 3—3 of Figure 2;

Figure 4 is a view on the plane indicated by line 4—4 of Figure 2;

Figure 5 is a view of the glass panel in one of its open positions;

Figure 6 is a view of the glass panel in another of its open positions. Figures 5 and 6 are taken on the same plane as Figure 3.

Referring now to the drawings, a vehicle body 2 has a windshield 4 and a swingably mounted door 6. Door 6 has a window opening 8 in its upper portion. A glass guide channel 14 is mounted within the window opening and separates the opening into a front and a rear portion. A slidable window glass 10 is mounted on suitable actuating mechanism within the door well and slides in the rear portion of the window opening 8. A movable glass panel 12 is mounted within the front portion of the window opening and is movable to one side of the opening to various air directing positions outside of the vehicle body 2. Although the movable glass panel 12 is shown in the front portion of the door window opening, it may be otherwise located.

Referring now to Figures 2 and 3, a channel member 16 is mounted within the front portion of window opening 8 by brackets 22 and 24 and is attached to the guide channel 14 at 18 and by bracket 20. Reinforcing member 17 is mounted on the base portion of channel member 16. Thus, movable glass panel 12 is framed on its front edge by channel member 16, on its base edge by channel member 16 and reinforcing member 17, and on its rear edge by glass guide channel 14. A weather strip has a base portion 26 which fits within channel member 16 and has side flaps 28 and 30 which overhang the sides of the channel member 16 and reinforcing member 17 to provide a neat appearance to the window opening. A suitable weather strip element may also be placed between the rear edge of the glass panel 12 and the glass guide channel 14.

A channel frame 32 is fitted around the front and base edge of the glass panel 12. A ball 34 is secured to channel member 32 at 35 and fits within a socket 36 secured to channel 16. An opening 37 through channel 16 and the weather strip 25 allows ball 34 to enter the socket. The ball and socket provides a universal joint connection between the movable glass panel 12 and the window channel member 16. A locking bolt 38 of known type is mounted on frame 32 and locks the panel 12 in its closed position.

A channel member 40 is secured along its upper leg to channel member 32 at 42 and the lower leg of channel 40 defines longitudinally extending slots 44 and 46 (Figure 2). The forward slot 44 is relatively short compared to the rearward slot 46. A forward actuating arm 48 is slidably mounted in slot 44 by pin 49 and a rearward actuating arm 50 is slidably mounted in slot 46 by pin 51. Actuating arm 48 is shorter than actuating arm 50. Shafts 53 and 55 are connected to actuating arms 48 and 50, respectively, or the arm and shaft may be integral. A friction clamp assembly composed of clamping member 52 and clamping members 54 spaces shafts 53 and 55. Member 52 has integral angular flange 80 secured to channel 16 and reinforcing member 17 at 56 (Figure 2). Member 52 is slotted at 81 and 82, and the angular bent ends 83 and 84 of members 54 extend through these slots to be anchored thereby as shown in Figures 2 and 3. The other ends of members 54 overlap, and bolt and nut 57 secure these ends to member 52. A cover plate 58 is secured to channel 32 at 42 and conceals the pin and slot assembly.

A gear housing 59 is mounted within the well of door 6 to an inner door panel 85 at 60 (Figure 5). The gear housing consists of two plates 61 and 62 stamped out at 64 and 66 to provide chambers for sector gears 68 and 69, and stamped out at 70 and 71 to form shaft bearing surfaces for a worm 72. Sector gear 68 is mounted on shaft 53, and sector gear 69 is mounted on shaft 55. The radius of gear 68 is greater than that of gear 69. Worm 72 fits between gears 68 and 69 and turns these gears. A handle 74 is provided for turning worm 72. After the gears have been assembled within the housing, plates 61 and 62 may be secured together by rivets 73.

The window moves as follows from the closed position of Figure 1 to the open position of Figure 5: As handle 74 turns worm 72, sector gears 68 and 69 will turn shafts 53 and 55. Since the radius of gear 69 is less than that of gear 68, shaft 55 will turn at a greater rate than shaft 53. When shafts 53 and 55 are turned, actuating arms 48 and 50 will swing outward of window opening 8 and move pins 49 and 51 in their respective slots 44 and 46. Initially the glass panel 12 moves slightly to the outside of window opening 8 as arms 48 and 50 begin to swing outwardly in their arcs and move pins 49 and 51 toward each other in their respective slots. As arm 50 swings outwardly of the window opening through its arc at a faster rate than arm 48, pin 51 continually moves in slot 46 toward pin 49, while pin 49 moves at a slower rate in slot 44 to a position substantially halfway between the ends of slots 44. The glass panel then swings outwardly about an axis through the ball and socket connection and through this position of pin 49 to the open position of Figure 5 wherein the front edge of the panel remains in contact with the weather strip 26. In this open position of the glass panel 12, pins 49 and 51 are substantially halfway between the inner and outer ends of their respective slots.

Figure 5 may be called the air exhaust position of the glass panel 12, for the forward motion of the vehicle will tend to draw air from the inside of the vehicle to the outside atmosphere. In this position of the glass panel 12 no portion of the panel is within the vehicle body. Therefore, if it happens to be raining, there will be no drippage from a portion of the glass panel to the inside of the vehicle body.

Assuming now that the glass panel 12 is in the open position of Figure 5 and it is desired to move it to the open position of Figure 6: Handle 74 is turned further in the same direction and pins 49 and 51 will move toward each other from their position substantially halfway between the extreme ends of slots 44 and 46 to positions at the adjacent or inner ends of the slots. This is the open position of the panel shown in Figure 6.

Figure 6 may be called the air inlet position of the panel, for the forward motion of the vehicle will tend to force air into the interior of the vehicle body. In this position of the glass panel 12 the rearward edge of the panel rests against the weather strip element provided on the glass guide channel 14 and no portion of the window is within the inside of the vehicle body.

As the panel moves from the open position of Figure 5 to the open position of Figure 6 it will pass through an intermediate position which may be called the fully open position of glass panel 12. As actuating arms 48 and 50 begin to move through their respective arcs and pins 49 and 51 again move toward each other from their position substantially halfway between the extreme ends of the slots, the glass panel will pass through an intermediate position wherein the base edge of the panel is substantially parallel to the base edge of window opening 8. In this intermediate position of glass panel 12, pins 49 and 51 are substantially near the adjacent or inner ends of slots 44 and 46. When pins 49 and 51 move from this position to a position at the adjacent or inner ends of the slots, the window will pivot from the fully open position to the open position of Figure 6 as described above.

Thus, pins 49 and 51 are at the outer extreme ends of slots 44 and 46 in the closed position of the glass panel shown in Figure 2; the pins will move from this position to a position substantially halfway between the outer and inner ends of slots 44 and 46 as the glass panel moves to the open position of Figure 5; the pins will move from the position halfway between the outer and inner ends of slots 44 and 46 to a position substantially near the adjacent or inner ends of the slots as the glass panel moves to the fully open position described above but not shown in the drawings; and pins 49 and 51 will move from the position substantially near the adjacent or inner ends of slots 44 and 46 to a position at the adjacent or inner ends of the slots as the panel moves to the open position of Figure 6. During the movement of the panel from the closed position of Figure 2 to any of the open positions of the panel, actuating arms 48 and 50 move through their respective arcs; the arc of arm 48 has a smaller radius than that of arm 50 and arm 50 will move at a greater rate than arm 48.

It can be seen that when the window is in the fully open position described above, a turning of handle 74 in one direction will move the window to the open position of Figure 6 and a turning of handle 74 in the opposite direction will move the window to the open position of Figure 5.

Thus, this invention provides a glass panel mounted within a window opening and movable to one side of the window opening to various air directing positions wherein no portion of the window is within the vehicle body. The glass panel will have a wide range of use in ventilation control of vehicle bodies. The weather strip 26 may be of very simple configuration inasmuch as no portion of the glass panel 12 crosses over the weather strip in any of the movements of the panel from the closed position to various open positions.

Although a specific embodiment of this invention has been shown and described, various changes and modifications may be made within the scope and spirit of the invention without departing from it.

What is claimed is:

1. In a vehicle body having a window opening therein, the combination comprising, a ventilation window adapted to close said opening, a universal joint connection mounted on said body and secured to one edge of said window to mount said window within said opening, and actuating means operatively secured to an opposite edge of said window for moving said window about said universal joint connection to a position to one side of the plane of said opening wherein one of the side edges of said window engages a respective side edge of said opening, said actuating means including first and second arm means rotatably mounted on said body for swinging movement laterally to the plane of said opening about substantially parallel spaced axes, said first arm means being shorter than said second arm means, stud means secured to a respective end of said first and second arm means, first and second slot means secured to said opposite edge of said window for slidably receiving a respective stud means, said stud means being positioned in the remote ends of said slot means when said window is in closed position and being movable toward the adjacent ends of said slot means as said arm means swing laterally to the plane of said opening to move said window to said position to one side of said opening, and gearing means operatively secured to said first and second arm means to rotate said second arm means about said axis at a greater rate than said first arm means whereby one portion of said window moves to said position to one side of said opening at a faster rate than an adjacent portion of said window.

2. In a vehicle body having a window opening therein, the combination comprising, a ventilation window adapted to close said opening, a universal joint connection mounted on said body and secured to one edge of said window to mount said window within said opening, and actuating means operatively secured to an opposite edge of said window for moving said window about said universal joint connection to a position to one side of the plane of said opening wherein one of the side edges of said window engages a respective side edge of said opening, said actuating means including first and second arm means rotatably mounted on said body for swinging movement at a differential rate laterally of the plane of said opening for moving said window to said position to one side of said opening, means pivotally and slidably securing each of said arm means to said opposite edge of said window, and gearing means operatively secured to said first and second arm means to swing said arm means at said differential rate of travel whereby one portion of said window moves to said position to one side of said opening at a greater rate than an adjacent portion of said window.

3. In a vehicle body having a window opening therein, the combination comprising, a ventilation window adapted to close said opening, a universal joint connection mounted on said body and secured to one edge of said window to mount said window within said opening, and actuating means operatively secured to an opposite edge of said window for moving said window about said universal joint connection to a position to one side of the plane of said opening wherein one of the side edges of said window engages a respective side edge of said opening, said actuating means including first and second arm means rotatably mounted on said body for swinging movement at a differential rate laterally of the plane of said opening for moving said window to said position to one side of said opening, slot means on said opposite edge of said window, stud means secured to each of said arm means and being slidably received within said slot means, said stud means being positioned at the remote ends of said slot means when said window is in closed position, and being movable toward each other as said arm means swing laterally of the plane of said opening to move said window to said position to one side of said opening, and gearing means operatively secured to said first and second arm means to swing said arm means at said differential rate of travel whereby one portion of said window moves to said position to one side of said opening at a greater rate than an adjacent portion of said window.

4. In a vehicle body having a window opening therein, the combination comprising, a ventilation window adapted to close said opening, a universal joint connection mounted on said body and secured to one edge of said window to mount said window within said opening, and actuating means operatively secured to an opposite edge of said window for moving said window about said universal joint connection to positions to one side of the plane of said opening wherein a side edge of said window engages a respective side edge of said opening, said actuating means including first and second arms rotatably mounted on said body for swinging movement at a differential rate laterally of the plane of said opening for moving said window to said positions to one side of said opening, means pivotally and slidably securing each of said arms to said opposite edge of said window, said arms being positioned substantially within the plane of said opening when said window is in closed position and being swingable toward each other at said differential rate for moving said window to a first position to one side of said opening wherein one of the side edges of said window engages a respective side edge of said opening and to a second position upon continued swinging movement thereof toward each other at said differential rate of travel wherein the other side edge of said window engages a respective side edge of said opening, and gearing means operatively secured to said first and second arms to swing said arms at said differential rate of travel whereby a portion of said window moves to said first and second positions at a greater rate than an adjacent portion of said window.

5. In a vehicle body having a window opening therein, the combination comprising, a ventilation window adapted to close said opening, a universal joint connection mounted on said body and secured to one edge of said window to mount said window within said opening, and actuating means operatively secured to an opposite edge of said window for moving said window about said universal joint connection to positions to one side of the plane of said opening wherein a side edge of said window engages a respective side edge of said opening, said actuating means including first and second arms rotatably mounted on said body for swinging movement at a differential rate laterally of the plane of said opening, said first arm being shorter than said second arm, a stud secured to each of said arms, a pair of slots on said opposite edge of said window for slidably receiving a respective stud and having their remote ends located adjacent the side edges of said window, said studs being positioned at the remote ends of said slots when said window is in closed position and being movable toward the adjacent ends of said slots as said arms swing laterally to the plane of said opening at said differential rate of travel to move said window to a first position to one side of said opening wherein one of the side edges of said window engages a respective side edge of said opening and a second position wherein the other side edge of said window engages a respective side edge of said opening, and gearing means operatively secured to said first and second arms to swing said arms at said differential rate of travel whereby a portion of said window moves to said positions to one side of said opening at a greater rate of travel than an adjacent portion of said window.

References Cited in the file of this patent

UNITED STATES PATENTS

| | | |
|---|---|---|
| 1,950,329 | Singer | Mar. 6, 1934 |
| 2,022,036 | Haberstump | Nov. 26, 1935 |
| 2,080,431 | Morrison | May 18, 1937 |
| 2,185,321 | Thoma | Jan. 2, 1940 |
| 2,211,665 | Mackey | Aug. 13, 1940 |
| 2,518,152 | Kramer | Aug. 8, 1950 |

FOREIGN PATENTS

| | | |
|---|---|---|
| 1,086,224 | France | Aug. 4, 1954 |
| 723,975 | Germany | Aug. 14, 1942 |
| 419,448 | Great Britain | Nov. 1, 1934 |
| 438,815 | Great Britain | Nov. 25, 1935 |
| 729,997 | Great Britain | May 11, 1955 |
| 366,936 | Italy | Jan. 13, 1939 |